United States Patent [19]

Koskie, Jr.

[11] 4,209,890
[45] Jul. 1, 1980

[54] METHOD OF MAKING A ROTARY ROCK BIT WITH SEAL RECESS WASHER

[75] Inventor: Earl T. Koskie, Jr., Casper, Wyo.

[73] Assignee: Dresser Industries, Inc., Dallas, Tex.

[21] Appl. No.: 4,778

[22] Filed: Jan. 19, 1979

[51] Int. Cl.² ............................................. E21B 9/10
[52] U.S. Cl. ..................................... 29/450; 175/371; 308/8.2; 76/108 R
[58] Field of Search ................ 175/371, 372; 308/8.2, 308/187.1; 277/58, 236; 76/108 R; 29/450

[56] References Cited

U.S. PATENT DOCUMENTS

| | | | |
|---|---|---|---|
| 3,193,028 | 7/1965 | Radzimovsky | 175/372 |
| 3,251,634 | 5/1966 | Dareing | 308/8.2 |
| 3,467,448 | 9/1969 | Galle | 308/8.2 |
| 3,604,523 | 9/1971 | Lichte | 175/372 |
| 3,612,197 | 10/1971 | Motoyama | 175/372 X |
| 3,656,764 | 4/1972 | Robinson | 277/92 |
| 3,713,707 | 1/1973 | Bennett | 308/187.1 X |
| 3,761,145 | 9/1973 | Schumacher, Jr. | 308/8.2 |

Primary Examiner—Ernest R. Purser
Assistant Examiner—Nick A. Nichols, Jr.
Attorney, Agent, or Firm—Eddie E. Scott; Fred A. Winans

[57] ABSTRACT

A sealing system for a rotary rock bit retains lubricant inside the bit and acts as a barrier to the pulverized cuttings and other materials in the borehole to prevent the materials from entering the bearing area through the cone mouth opening of the rolling cone cutter. A protecting washer is positioned outside of an O-ring seal element in the gap between the base of the rolling cone cutter and the body of the earth boring bit. This protects the O-ring seal element from the hostile drilling environment and increases seal life. During assembly of the bit, a gauging station is established to measure the size of the gap that will exist when the rolling cone cutter is installed on the bit body. Protecting washers are provided in numerous thicknesses. Upon determining the size of the gap, a washer is selected that will allow the gap to be narrowed to a size that will restrict passage of most of the abrasive particles found in the drilling fluid. The protecting washer is pressed into a recess in the cone mouth opening of the rolling cone cutter.

2 Claims, 5 Drawing Figures

METHOD OF MAKING A ROTARY ROCK BIT WITH SEAL RECESS WASHER

TECHNICAL FIELD

The present invention relates to the art of rolling cone cutter earth boring bits and, more particularly, to a rolling cone cutter earth boring bit with improved means for sealing the bearings of the bit from the abrasive materials in the borehole and retaining lubricant within the bearing area.

BACKGROUND OF THE INVENTION

A rolling cone cutter earth boring bit consists of a main bit body adapted to be connected to a rotary drill string. The bit includes individual rotatable cone cutters mounted on individual bearing pins extending from the main bit body. Bearing systems are provided between the cone cutters and the bearing pins to promote rotation of the cutters and means are provided on the outer surface of the cone cutters for disintegrating the earth formations as the bit and the cutters rotate. A sufficient supply of uncontaminated lubricant should be maintained proximate the bearing systems throughout the lifetime of the bit. Various forms of seals have been provided between the cone cutters and the bearing pins upon which they are mounted to retain lubricant and prevent contamination; however, the need for new sealing systems is as acute today as any time in the history of rock drilling.

A rolling cone cutter earth boring bit must operate under very severe conditions and the size and geometry of the bit is restricted by the operating characteristics. At the same time, a longer lifetime and improved performance is needed from the bit. In attempting to provide an improved bit, new and improved materials have been developed for the cutting structure of the cone cutters. They have provided a longer useful lifetime for the cone cutters. This has resulted in the sealing and bearing systems of the bit being often the first to fail during the drilling operation. Consequently, a need exists for new and improved sealing and bearing systems to extend the useful lifetime of the bit and to allow development of other elements that interact with the sealing and bearing systems. Various prior art sealing systems have been provided to maintain the bearing area free of harmful materials and retain lubricant. In attempting to provide new sealing systems, great care must be taken that the overall capacity of the bearing systems is not reduced.

In order to more fully appreciate the problems involved in providing new sealing systems for rolling cone earth boring bits, the following factors should be borne in mind. Relatively loose manufacturing tolerances inherently necessary in bit bearing assemblies create sealing problems that have not been satisfactorily solved. The required manufacturing tolerances preclude effective use of the many common shaft sealing methods due to the limited ability of shaft seals to accept loose radial fits while still maintaining an effective sealing condition. Many bits utilize face type seals. These are usually of the rubber coated Belleville spring urged type since this type consumes a minimum of space. This rubber coated spring has been only moderately successful because the rubber sealing element is subject to rapid deterioration both through friction heating and through abrasion from exposure to the very deleterious environment encountered in oil well or blast hole drilling operations. Face type seals have not provided the long life and sealing efficiency necessary for non-friction bearing bits. Tight fitting friction type bearings using shaft seals such as rubber O-rings have had a relatively high degree of success but only in areas where proper cooling, such as a circulating liquid, can be supplied to the bit exterior environment. Such seals tend to deteriorate rapidly if subjected to abrasive materials and heat. Tolerance requirements also present problems because of the tight fitting requirements. The bit bearings should be a maximum size to withstand the very heavy loads imposed while at the same time yielding to the hole size limitations specified by the user. A dilemma of adapting a maximum capacity bearing in a minimum of space is produced. This dilemma invariably leads to compromises which circumvent many of the well known requirements for proper assembly and use of high precision elements. This tolerance accumulation presents obstacles in providing an improved sealing system.

DESCRIPTION OF PRIOR ART

In U.S. Pat. No. 3,761,145 to Percy W. Schumacher, Jr., patented Sept. 25, 1973, a drill bit seal means is shown. A drill bit including a roller cutter mounted on a greased bearing journal having a grease seal ring therearound and resilient means mounted between the seal ring and bearing journal to urge the seal ring against a sealing surface on the cutter in such a manner that the seal ring may be forced away from the cutter surface by some predetermined pressure from within the cutter but wherein the seal ring arrangement provides a substantially positive seal from pressures externally of the cutter to prevent detritus or other foreign material from entering into the bearing area interiorly of the drill bit cutter is provided. Elastomeric material may be provided between the seal ring and the cutter sealing surface.

In U.S. Pat. No. 3,656,764 to William P. Robinson, patented Apr. 18, 1972, a seal assembly for a drill bit is shown. An earth boring drill bit employing roller cutters is provided with an improved seal for inhibiting ingress of abrasive materials into the bearing surfaces and egress of lubricant. The improved seal is between an outwardly facing re-entrant corner on the journal and an inwardly facing re-entrant corner on the cutter. The seal is made by a pair of O-rings engaging the opposed re-entrant corners and separated by a floating rigid ring having opposed bearing surfaces for seating the O-rings into the corners. This seal accommodates radial, axial and angular displacements of almost twice the magnitude that can be accommodated by a single O-ring of the size of one of the O-rings without significantly increasing the length of journal needed for the seal.

In U.S. Pat. No. 3,397,928 to E. M. Galle, patented Aug. 20, 1968, a seal means for drill bit bearings is shown. The seal means includes a shaft rigidly secured to a drill bit body with a bearing surface formed thereon. A cutter element is rotatably mounted to said shaft and includes a bearing surface thereon that opposes and engages the bearing surface on the shaft. A resilient packing ring is positioned in a groove in one of the surfaces. The packing ring, the groove and an opposing surface are sized such that upon assembly of the cutter element upon the shaft the cross sectional thickness of the packing ring is compressed by not less than substantially 10% of this thickness prior to assembly of the cutter element upon the shaft.

Other drill bit bearing systems are shown in U.S. Pat. No. 1,884,965 to Baggett, U.S. Pat. No. 2,797,067 to Fisher, U.S. Pat. No. 3,075,781 to Atkinson, U.S. Pat. No. 3,096,835 to Neilson, U.S. Pat. No. 3,151,691 to Goodwin, U.S. Pat. No. 3,303,898 to Bercaru, U.S. Pat. No. 3,529,840 to Durham and U.S. Pat. No. 3,862,762 to Millsap.

SUMMARY OF THE INVENTION

The present invention provides a sealing system for a rolling cone cutter earth boring bit that retains lubricant inside the bit and acts as a barrier to the pulverized cuttings and other materials in the borehole to prevent the materials from entering the bearing area through the cone mouth opening of the rolling cone cutter. A protecting washer is positioned outside of an elastomer seal element in the gap between the base of the rolling cone cutter and the body of the earth boring bit. The washer protects the elastomer seal element from the hostile drilling environment and increases seal life. During assembly of the bit, a gauging station is established to measure the size of the gap that will exist when the rolling cone cutter is installed on the bit body. Protecting washers are provided in numerous thicknesses. Upon determining the size of the gap, a washer is selected that will allow the gap to be narrowed to a size that will restrict passage of most of the abrasive particles found in the drilling fluid into the seal area. The protecting washer is pressed into a recess in the cone mouth opening of the rolling cone cutter. The above and other features and advantages of the present invention will become apparent upon consideration of the following detailed description of the invention when taken in conjunction with the accompanying drawings.

DETAILED DESCRIPTION OF THE INVENTION

Figures 1, 2:
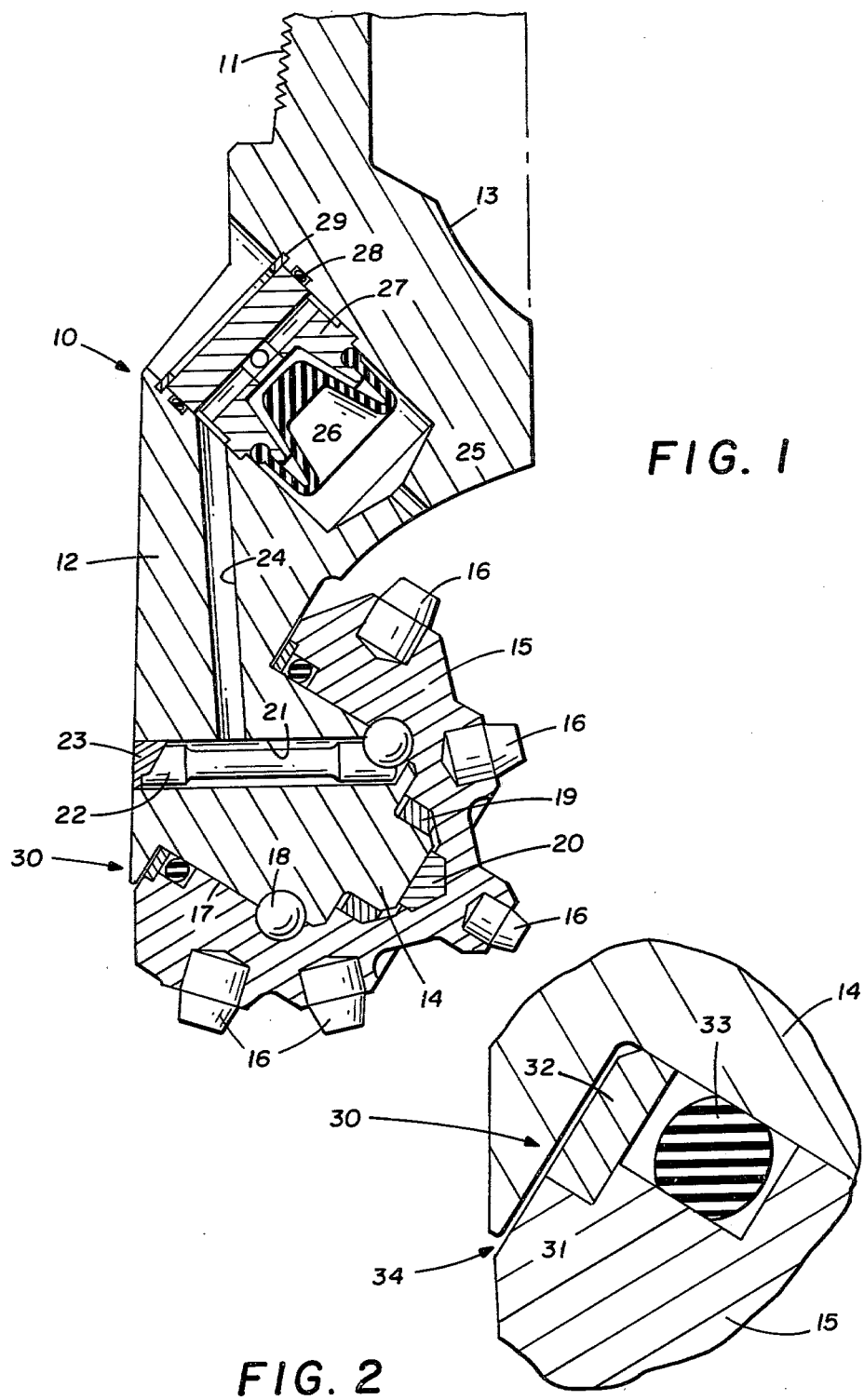
FIG. 1 is an illustration, partially in section, of one arm of an earth boring bit constructed in accordance with the present invention.
FIG. 2 is an enlarged view illustrating the seal assembly of the bit shown in FIG. 1.

Referring now to FIG. 1, a sectional view of one arm 12 of a rolling cone earth boring bit 10 illustrating the present invention is shown. The rolling cone cutter earth boring bit 10 consists of a main bit body 13 adapted to be connected to a rotary drill string. The bit 10 includes individual rotatable cone cutters mounted on individual bearing pins extending from the main bit body. A sealing system 30 acts as a barrier to the pulverized cuttings and other abrasive materials in the borehole to prevent these materials from entering the bearing area of the bit and retains lubricant within the bearing area.

The arm 12 depends from the upper portion 11 of the bit 10. The upper portion 11 allows the bit to be connected to the lower end of a rotary drill string (not shown). The lower end of arm 12 is provided with an extended journal portion 14. A rolling cone cutter 15 is rotatably positioned upon the extended journal portion or bearing pin 14. The base of cutter 15 is positioned against the cutter receiving surface of the bit body. The cutter 15 includes cutting structure 16 on its outer surface adapted to disintegrate the formations as the bit 10 is rotated and moved downward. The cutting structure 16 is shown in the form of tungsten carbide inserts. However, it is to be understood that other cutting structures such as steel teeth may be used as the cutting structure on the cone cutter 15.

The bit 10 includes a central passageway extending along the central axis of the bit to allow drilling fluid to enter from the upper section of the drill string (not shown) immediately above and pass downward to the bottom of the well bore to flush cuttings and drilling debris from the well bore. A plurality of bearing systems are located in the bearing area between the cutter 15 and the bearing pin 14. The bearing systems in the bearing area include an outer friction bearing 17, a series of ball bearings 18, a friction bearing 19, and a thrust button 20.

The bit 10 is a lubricated sealed bearing bit. The lubrication system of bit 10 includes a passage 24 that extends through the arm 12 to bearing pin 14 to allow lubricant to be transmitted to the bearing systems. A passage 21 connected to passage 24 allows the make up of the ball bearing system 18 by allowing the balls to be inserted into position after the cone cutter 15 is placed on the bearing pin 14. The series of ball bearings 18 serves to lock the cone cutter 15 on the bearing pin 14. After the balls are in place, a plug 22 is inserted into the bore 21 and welded therein by a weld 23. Plug 22 has a reduced diameter throughout the major portion of its length to allow lubricant to be transmitted to the bearing area. Additional passages may extend from bore 21 to the bearing area to insure a sufficient supply of lubricant to bearings 17, 18, 19 and 20.

A lubricant reservoir is located in the bit 10 to provide a supply of lubricant to the bearings. A flexible diaphragm 26 is positioned in the lubricant reservoir and encloses the reservoir to retain a supply of lubricant. The area within the reservoir chamber but outside of the diaphragm 26 is vented to the dome of the bit 10 by a passageway that connects the lower end of the reservoir chamber with the dome of the bit. The upper end of the lubricant reservoir is closed by a cap 27 locked in place by a snap ring 29. An O-ring seal 28 is positioned around the cap 27 to retain lubricant in the lubricant reservoir.

A seal assembly 30 is located between the bearing pin 14 and the rolling cone cutter 15. The seal assembly 30 retains the lubricant within the bit 10 and prevents the ingress of materials in the borehole into the bearing area. Details of the seal assembly will be described in detail subsequently.

Referring now to FIG. 2, an enlarged view of the seal assembly 30 is shown. A recess 31 is milled in the backface of the rolling cone cutter 15. A washer 32 will be pressed into the recess 31. The washer 32 will be retained by interference fit. An O-ring seal element 33 is located within the cone mouth of rolling cone cutter 15 inside the washer 32. During assembly of the bit 10, a gauging station is established to measure the size of the gap 34 that will exist when the rolling cone cutter 15 is installed on the bit body. Protecting washers are provided in numerous thicknesses. Upon determining the size of the gap, a washer is selected that will allow the gap to be narrowed to a size which will not allow passage of most of the abrasive particles found in the drilling fluid into the seal area. This will be explained further with reference to FIG. 3 wherein a different size gap is shown.

Figure 3:
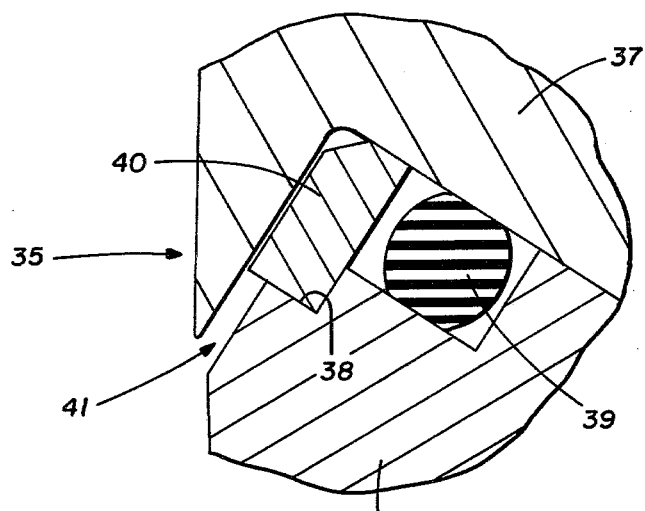
FIG. 3 is a further illustration of the seal assembly of the bit shown in FIG. 1.

As shown in FIG. 3, a seal assembly 35 of a rolling cone cutter earth boring bit is shown wherein the gap 41 between the base of the rolling cone cutter 36 and the body of the bit is larger than the gap 34 shown in FIG. 2. The larger gap may be the result of tolerance accumulation of the many parts that contribute to the size of the gap 41. A recess 38 is milled in the backface of the rolling cone cutter 36. An O-ring seal element 39 is located within the cone mouth of the rolling cone cutter 36. During assembly of the bit, a gauging station is established to measure the size of the gap 41 that will exist when the rolling cone cutter 36 is mounted on the bearing pin 37. Protecting washers are provided in numerous thicknesses. Upon determining the size of the gap 41, the washer 40 is selected that will allow the gap to be narrowed to a size which will not allow passage of most of the abrasive particles found in the drilling fluid. The bit is assembled with the O-ring seal element 39 positioned inside the protecting washer 40. By positioning the washer 40 in the gap 41, the larger size abrasive particles found in the drilling mud cannot contact the O-ring seal element 39. This protects the O-ring seal element from the hostile drilling environment and increases seal life.

The structural details of an embodiment of an earth boring bit constructed in accordance with the present invention having been described, the operation of the bit will now be considered with reference to FIGS. 1 and 2. The present invention provides a cone mouth seal which will act as a barrier to the pulverized cuttings, keeping these cuttings from entering the bearing area through the cone mouth opening, thus providing an uncontaminated environment for the metal bearing elements and eliminating the abrasive wearing action of foreign materials in the bearing area. The lubricant is retained within the bit to insure a long lifetime for the bearing systems. The shirttail and cone base of the rolling cutter cooperate to restrict materials in the borehole from contacting the O-ring seal element.

The present invention will close up the gap between the rolling cone cutter and the bit arm more closely than as presently machined. This gap is not always the same size. A gauging station is set up to quickly measure what the actual gap will be when the cone cutter is installed upon an arm. The washers are provided in several standard thicknesses. Upon determining exactly what the above mentioned gap will be, a washer is selected to close the gap. The washer is then pressed into the recess on the cone cutter. Thus the gap will be consistently narrowed to a size which would not allow passage to the seal area by most of the abrasive particles found in the drilling fluid.

The lubrication system of the bit is filled with a suitable lubricant and the area above the flexible diaphragm is completely filled with lubricant. The flexible diaphragm seals the lower end of the lubricant reservoir and is held in place by the lower portion of the cap. The bit will be lowered into a well bore until the cutter contacts the earth formation at the bottom of the borehole. The hydrostatic pressure of fluid in the well bore is substantial and a pressure differential between the pressure of the lubricant inside of the bit and the pressure of fluid in the borehole would ordinarily develop. The lubrication system of the bit allows the pressure of fluid in the well bore to be transmitted to the lubricant in the lubricant reservoir and the pressures are equalized as the bit is moved through the borehole. Lubricant from the lubricant reservoir is transmitted to the bearing systems.

The bit is connected as the lowest element of a rotary drill string by engaging the bit with the drill string by a threaded connection. The bit is rotated and thrust downward, thrusting the cutter against the earth formations. Continued rotation with the weight of the drill string applying a thrust force to the bit causes the cutters to disintegrate the formations and form the desired borehole. The cone mouth seal serves to prevent drill cuttings from entering the bearing area and retains the lubricant inside the bit.

Figure 4:
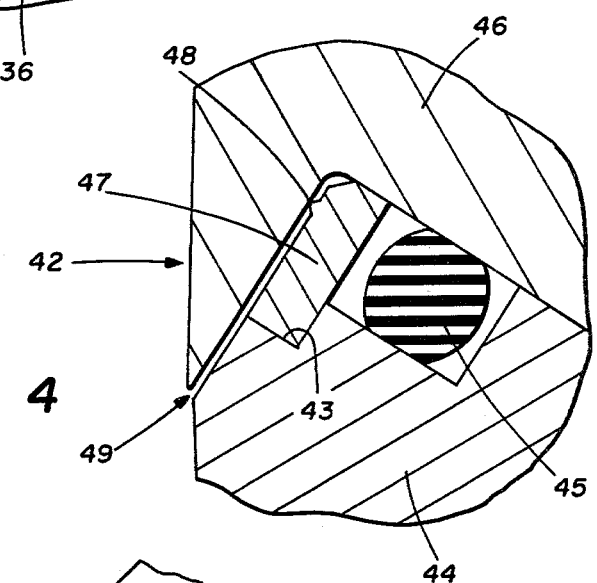
FIGS. 4 and 5 illustrate another embodiment of an earth boring bit constructed according to the present invention.
Figure 5:
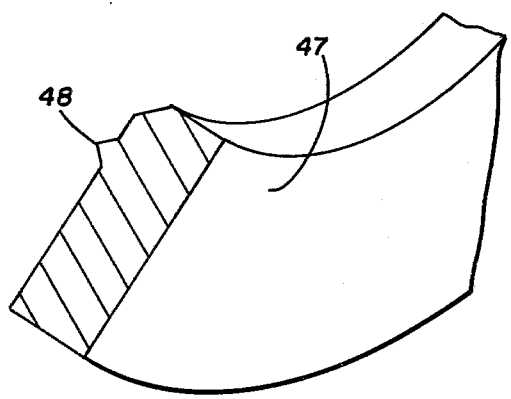

Referring now to FIGS. 4 and 5, an enlarged view of a seal assembly 42 of another embodiment of the present invention is illustrated. A recess 43 is milled in the backface of a rolling cone cutter 44. A washer 47 will be pressed into the recess 43. The washer 47 will be retained by interference fit. An O-ring seal element 45 is located within the cone mouth of rolling cone cutter 44 inside the washer 47. During assembly of the bit, a gauging station is established to measure the size of the gap 49 that will exist when the rolling cone cutter 44 is installed on the bit body 46. Protecting washers are provided in numerous thicknesses. Upon determining the size of the gap 49, a washer is selected that will allow the gap to be narrowed to a size which will not allow passage of most of the abrasive particles found in the drilling fluid into the seal area. An interference ridge 48 is located on the washer 47. This ridge 48 actually contacts the arm 46, and provides maximum protection for the O-ring seal 45. In time, it will be worn away, but the washer 47 still will protect the seal as described above. During the initial period the ridge 48 will have provided even more protection.

The embodiments of an invention in which an exclusive property or privilege is claimed are defined as follows:

1. A method of constructing a rotary rock bit for operating in a drilling fluid containing abrasive particles, comprising the steps of:

providing a rock bit body having at least one depending arm with a bearing pin projecting from said arm;

providing a rolling cone cutter adapted to be mounted on said bearing pin, said rolling cone cutter having a base that will be located abutting said arm and a concave cavity projecting from a cone mouth with said cavity and cone mouth adapted to be positioned over said bearing pin;

a gap being produced between said base of said rolling cone cutter and said arm when said rolling cone cutter is mounted on said bearing pin, said gap being outside of said cavity;

producing a groove in the base of said rolling cone cutter around said cone mouth;

determining the size of the gap that will be produced when said rolling cone cutter is mounted on said bearing pin;

providing a multiplicity of washers of varying thickness;

selecting a washer from said multiplicity of washers with a thickness substantially the size necessary to allow the gap to be narrowed to a size which will not allow passage of most of the abrasive particles found in the drilling fluid;

providing an elastomer seal ring;

positioning said elastomer seal ring between said bearing pin and said rolling cone cutter in said concave cavity proximate said cone mouth;

positioning said washer in said groove; and mounting said rolling cone cutter on said bearing pin with said washer substantially closing the gap between the base of said rolling cone cutter and said arm to prevent passage of most of the abrasive particles found in the drilling fluid.

2. A method of constructing a rotary rock bit for operation in a drilling fluid containing abrasive particles, comprising the steps of:

providing a rock bit body having at least one depending arm with a bearing pin projecting from said arm;

providing a rolling cone cutter adapted to be mounted on said bearing pin, said rolling cone cutter having a base that will be located abutting said arm and a concave cavity projecting from a cone mouth in said base with said cavity and cone mouth adapted to be positioned over said bearing pin;

producing a groove in the base of said rolling cone cutter around said cone mouth;

a gap being produced between said base of said rolling cone cutter and said arm when said rolling cone cutter is mounted on said bearing pin, said gap being outside of said groove;

determining the size of the gap that will be produced when said rolling cone cutter is mounted on said bearing pin;

providing a multiplicity of washers of varying thickness;

selecting a washer from said multiplicity of washers with a thickness substantially the size necessary to allow the gap to be narrowed to a size which will not allow passage of most of the abrasive particles found in the drilling fluid;

providing an elastomer seal ring;

positioning said elastomer seal ring between said bearing pin and said rolling cone cutter in said concave cavity proximate said cone mouth;

positioning said washer in said groove; and mounting said rolling cone cutter on said bearing pin with said washer substantially closing the gap between the base of said rolling cone cutter and said arm to prevent passage of most of the abrasive particles found in the drilling fluid.

* * * * *